May 13, 1941.  F. C. SCHWAB  2,242,044
ANTIGLARE DEVICE
Filed June 1, 1939  2 Sheets-Sheet 1
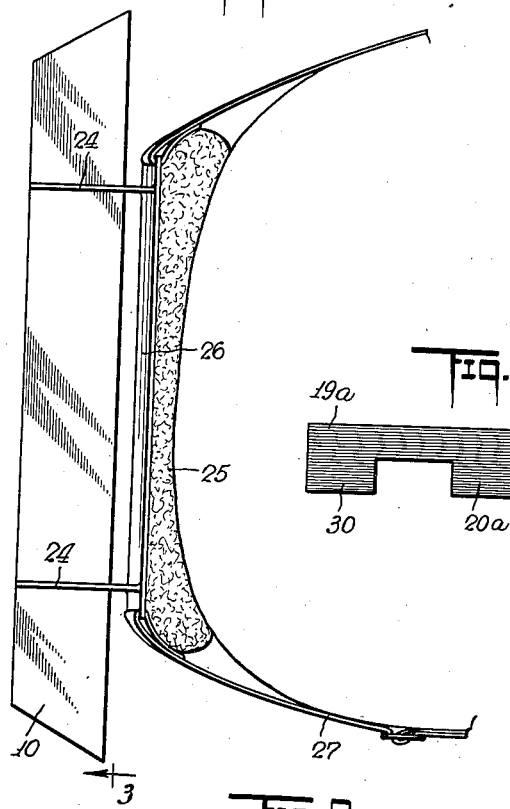
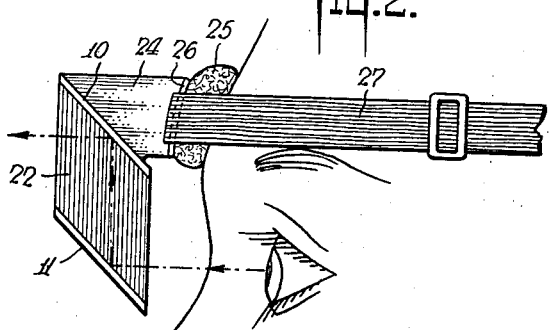
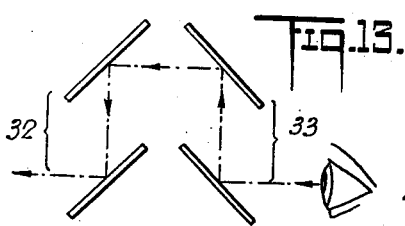
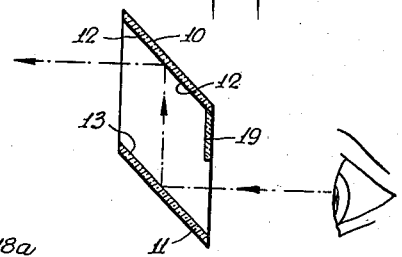
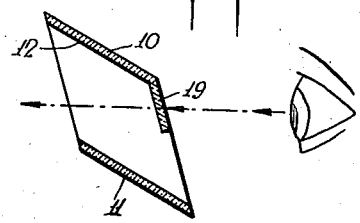
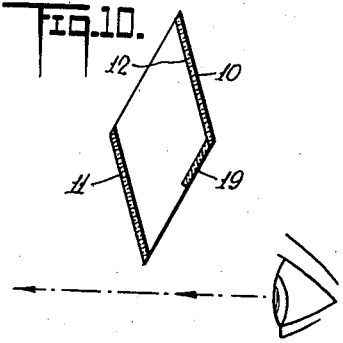
INVENTOR
Francis C. Schwab
BY
ATTORNEYS May 13, 1941.　　　F. C. SCHWAB　　　2,242,044
ANTIGLARE DEVICE
Filed June 1, 1939　　　2 Sheets-Sheet 2
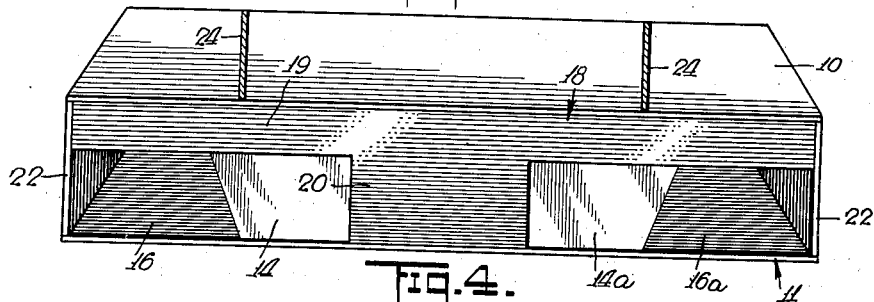
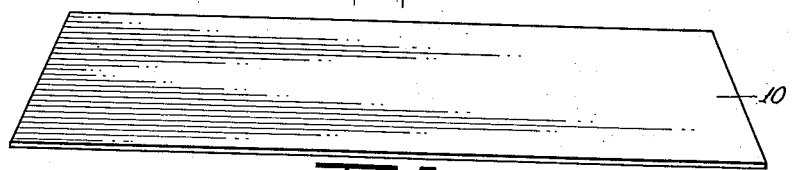
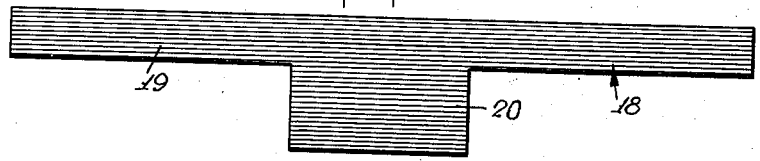
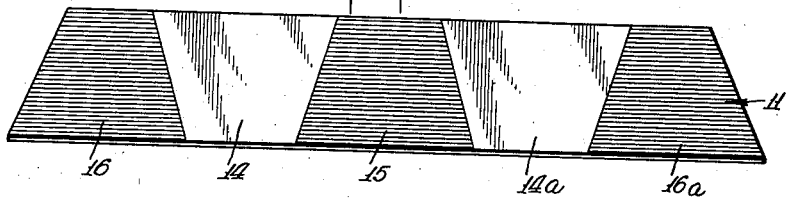
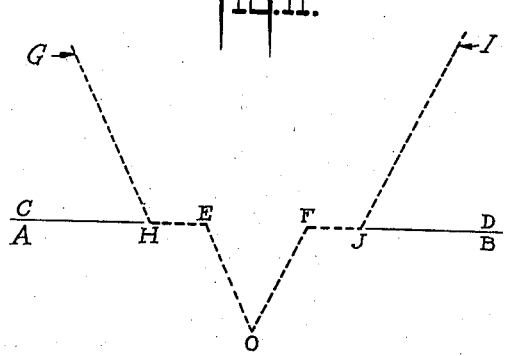
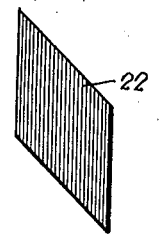
INVENTOR
*Francis C. Schwab*
BY
ATTORNEYS Patented May 13, 1941

2,242,044

UNITED STATES PATENT OFFICE 2,242,044

ANTIGLARE DEVICE

Francis C. Schwab, Mexico, D. F., Mexico

Application June 1, 1939, Serial No. 276,759

8 Claims. (Cl. 88—41)

The present invention relates to anti-glare devices, particularly for use by the driver of a vehicle, to protect his eyes from the headlight glare of approaching vehicles when driving at night.

One object of the present invention is to provide a simple and effective anti-glare device, which is adapted to be placed before the eyes of an observer, and which has means for providing clear and darkened sectors of vision with their lateral margins so disposed, that minimum movement of said device or of the observer is required to afford a clear view along the line of travel directly ahead of the automobile where there is no glare, and a glareless view of the area laterally thereof where objectionable glare is present.

In carrying out the present invention, there is provided a pair of spaced clear mirror surfaces, arranged in the form of an altiscope to afford a limited clear reflected view, and glare screens so disposed, that they can be easily and conveniently brought into the line of vision to afford glareless views outside the limits of the clear view. These glare screens also serve to restrict the sector of clear vision, so that said sector does not include glare areas.

As a further feature, the glare absorbing sections of the device are so arranged with respect to the clear mirror sections as to afford the effect of twin altiscopes, disposed in the line of the road vision of the respective eyes of the observer. This construction prevents cross-reflection of lateral glare from the part of the device comprising the left altiscope to the right eye, and from the part of the device comprising the right altiscope to the left eye.

Various other objects, features, and advantages of the invention will be apparent from the following particular description, and from an inspection of the accompanying drawings, in which:

Fig. 1 is a top plan view of one form of antiglare device, embodying the present invention, and shown attached to the head of an observer, Fig. 2 is an end elevation of the anti-glare device, shown as secured to the head of an observer, Fig. 3 is a section of the device taken on line 3—3 of Fig. 1, Fig. 4 is a top plan view of the upper mirror plate of the device, Fig. 5 is a front elevation of the front glare absorbing plate of the device, Fig. 6 is a top plan view of the lower plate, having a series of alternate clear mirror and glare screening sections, Fig. 7 is a side elevation of one of the glare screening end pieces of the device, Figs. 8, 9 and 10 are vertical sections of the device, showing respectively the different tilted positions thereof with respect to the observer's eye, Fig. 11 is a diagrammatic top plan view, showing the convergence of reflected lateral rays in their course from the upper to the lower plate, Fig. 12 is a front elevation of another form of front glare screening plate shown on a reduced scale, and Fig. 13 is an end view somewhat diagrammatic, showing another form of my anti-glare device.

The anti-glare device of the present invention is adapted to be placed before the eyes of the observer, so that he may look directly thereinto, and comprises a pair of superposed parallel oblong plates 10 and 11, arranged in the manner of an altiscope, and extending obliquely forwardly and upwardly of the observer at substantially 45° with the horizontal in the normal position shown in Fig. 8.

The shape of these plates 10 and 11 is desirably quadrilateral, with opposed longitudinal edges substantially parallel, and with the side edges converging forwardly and away from the observer. The underside of the upper plate 10 has a clear mirror surface 12, desirably along the full area thereof for reflecting direct image rays therefrom downwardly to the upper side of the lower plate 11. This lower plate 11 is provided with a pair of similar clear mirror sections 14 and 14a on its upper side 13, facing the mirror surface 12 of the upper plate 10, a glare absorbing or screening section 15 between said mirror sections, desirably in the form of a darkened, colored or shaded transparent screen, and a pair of glare absorbing or screening sections 16 and 16a, also desirably in the form of darkened transparent screens, on the outer sides of said mirror sections.

The plates 10 and 11 may be made of clear glass or other transparent material, with suitable backing to form the clear reflecting surface 12 and the clear reflecting surfaces 14 and 14a, and colored or darkened transparent films or layers superposed on the other parts of the lower plate 11 to form the glare screens 15, 16 and 16a. As far as certain aspects of the invention are concerned, these glare screens may be darkened reflecting surfaces, formed by superposing colored transparent films or layers on clear reflecting surfaces. In either of these constructions, the glare screens may be made by coloring or darkening the glass itself to the extent of their surfaces. If desired, the plates 10 and 11 may be made of metal with polished surfaces, to form the clear reflecting surface 12 and the clear reflecting sections 14 and 14a.

The two mirror sections 14 and 14a desirably have their sides converging substantially towards the eyes of the observer, and are disposed with their centers corresponding respectively with the observer's eyes, so that the left eye can look straight ahead into the center of the mirror section 14, and the right eye straight ahead into the center of the mirror section 14a.

In the front part of the device is a glare screening member 18, desirably in the form of a dark transparent plate, and comprising a comparatively narrow section 19, extending downwardly from the front edge of the upper mirror plate 10, and along the full length thereof, and a central rectangular section 20, extending in front of the darkened transparent section 15 and between the two plates 10 and 11.

Connected to and extending across the ends of the device are glare screening end pieces 22, desirably in the form of dark or colored transparent rhomboid plates, and serving to prevent the darkened lateral views from being cut off at their extreme outer lateral margins.

The various parts of the device shown in Figs. 4, 5, 6 and 7 are assembled as shown in Fig. 3, and are held together by any suitable means, as for instance cementing, screws, brackets, bands or other fastening expedients utilized in the optical art. If desired, the front glare absorbing plate 18 may be hinged to the upper plate 10 by suitable hinges to facilitate cleaning of the device, and held in position across the front of the two plates 10 and 11 by a suitable catch.

In the position shown in Fig. 8, the colored transparent plate section 19 should be high enough to avoid obstructing the view into the lower reflecting plate 11. Another position for this section 19 is on the rear or forward side of the device, extending upwardly from the forward edge of the plate 11. In this latter position, the plate section 19 should be low enough to avoid obstructing the passage of the image rays to the reflecting surface of the plate 10. If desired, two plate sections 19 may be disposed in both of the positions referred to.

When the observer looks straight ahead into the reflecting sections 14 and 14a of the lower plate 11, he sees therein a clear reflected view of the road free from glare in a limited sector directly ahead of him. The angle of the mirror sections 14 and 14a with respect to the observer's eyes automatically corrects and compensates for the angle at which the upper reflecting plate 10 reflects the image rays, so that the view observed in said sections will be true, undistorted and unconfused. Although this clear reflected view is seen at a level which is lower than the level of the actual view because of the altiscope arrangement of the two plates 10 and 11, this difference is negligible and unnoticeable.

The darkened transparent sections 16 and 15 afford a direct darkened lateral view to the left of the clear sector of vision, and the darkened transparent sections 15 and 16a afford a direct darkened lateral view to the right. These darkened transparent sections serve also to prevent such cross-reflection of glare that would without them be caught by the vision from the left portion of the reflecting plate 10 to the reflecting section 14a, and then to the right eye, or from the right portion of the plate 10 to the reflecting section 14 to the left eye. The section 20 darkens the view observed by the left eye in the reflecting section 14a, and darkens the view observed by the right eye in the reflecting section 14. By means of this arrangement, the clear view reflected to the vision of each eye is confined to that reflected from the single altiscope section opposite said eye, without optical interference from the single altiscope section opposite the other eye, so that the effect is that of twin separate and independent altiscope units. If the eyes are sufficiently close to the reflecting sections 14 and 14a and these reflecting surfaces are narrowed sufficiently, the shaded section 20 may be eliminated.

The device may be attached to the roof or other part of the car by any suitable means as for instance a ball and socket arrangement, and suspended before the driver's eyes in such a way that it may be adjusted to its proper position, moved towards or away from the driver's eyes and tilted about its longitudinal axis. In this form, the adjustments, to meet varying conditions of glare, are made by moving the device by hand, by independent movements of the head or by both of these methods.

In another form, the device may be divided into two separate units for the driver's eyes respectively, and attached jointly or separately by suitable clips to the frames of ordinary corrective eyeglasses. In this form, the two end pieces 22 of each unit will serve as the main glare screens, so that the glare screens 16 and 15 of the left unit and the glare screens 15 and 16a of the right unit are reduced in size, or in certain cases may be entirely eliminated.

In desirable form, the device is attached as a single unit to the driver's head as shown in Figs. 1 and 2, in such a way as to obtain the necessary adjustments of the device by slight instinctive movements of the head. In the specific form shown, there is connected to the upper reflecting plate 10 by any suitable means as for instance cement or screwed clamps, a pair of brackets 24, carrying a soft pad 25 at one end, by means of a cross-plate 26 between said brackets. This pad 25 is adapted to be strapped on the driver's forehead by an adjustable elastic band 27. This form of head attachment permits the use of ordinary corrective eyeglasses between the driver's eyes and the anti-glare device.

When looking straight ahead into the strapped device as shown in Fig. 8, the plates 10 and 11 thereof will extend at an angle of 45° with the horizontal line of vision, and the eyes will observe with ease and eye-comfort in the mirror sections 14 and 14a a clear reflected view along the line of travel directly ahead of the automobile, this view being so restricted by the glare screens 15, 16 and 16a as to exclude the glare areas on the side of the road resulting from the headlights of cars travelling in opposite directions. These glare screens may be brought into view by looking through the darkened transparent sections 16 and 15 or 15 and 16a, which screen out the glare vibrations and afford safe visibility of these areas. Part or all the view through 15 may be seen through 20, according to the respective widths of these sections.

Very often because of curves in the road, or because an approaching car is passing another car traveling in the same direction, the approaching glare is close to and directly in front of the driver. Also, because of converging roads, glare may be directed to the driver's eyes from both the left and the right simultaneously. These emergency conditions may be met by slight downward inclination of the head as shown in Fig. 9, to bring the longitudinal darkened transparent section 19 into position across the driver's direct vision. When looking through this shaded section 19, and through the space between the plates 10 and 11, the driver will see a darkened view across the full width of the road ahead of him, this darkened view being extended laterally by observations through the end pieces 22. In this tilted position, the driver can still look downwardly into the mirror sections 14 and 14a to observe a limited clear reflected view.

By an upward inclination of the head as shown in Fig. 10, a wholly clear direct view may be seen under the device.

One advantage of the altiscope arrangement is that the rays that strike the upper reflecting surface 12 converge towards the lower reflecting surfaces 14 and 14a, so that a view projected on the upper reflecting plate 10 will be seen on the corresponding lower reflecting sections 14 and 14a across a narrower width.

Fig. 11 shows diagrammatically the top plan view of certain rays with respect to the longitudinal center lines of the superposed plates 10 and 11. In this drawing, AB designates the longitudinal center line of the lower plate 11, and CD the longitudinal center line of the upper reflecting mirror 10, directly above the line AB, and shown coinciding with said latter line. E and F represent the intersections of the margins of the mirror section 14 with the center line AB. G designates a direct ray from the image on the outer left hand margin of the sector of clear view seen by reflection in the lower section 14. This ray G strikes the center line CD of the upper mirror plate 10 at the point H, and will be reflected therefrom to the lower mirror section 14 at the point E on the center line AB. Thus the ray G is seen by the left eye O along the line OE, which is parallel to said ray and in the same oblique plane, and which represents the extreme lateral left hand margin of the clear reflected view. Similarly, an extreme clear ray I to the right of the left eye O will be reflected from the point J in the upper mirror 10 to the margin point F in the lower mirror 14, and will be seen by the eye O along the line OF parallel to said ray, and representing the extreme lateral right hand margin of the clear reflected view seen by said left eye.

As a result of this construction, the eye O sees within the comparatively small margin space EF of the mirror 14 and close to said eye, a clear horizontal view of greater width, included in the sector between the rays G and I, so that the margins of the darkened view are placed within effective limits. This altiscope effect permits the darkened transparent sections 16 and 15, determining the width of the narrow section 14, to be placed closer together by a distance equal to 2HE or HE+FJ, and the darkened transparent sections 15 and 16a to be placed closer together by the same distance, without cutting down on the required area of clear view reflected to the eyes. This closer positioning of the darkened sections 15, 16, and 16a serves to reduce to a minimum the movement of the device necessary to bring these sections into line of sight.

A further advantage of this altiscope arrangement is the polarizing effect on the reflected light.

The effects above described are produced, whether the glare screens 15, 16 and 16a are darkened mirrors or darkened transparent plates. With darkened mirrors, the inner margins of the darkened views coincide with the outer margins of the clear view, so that the width of the sector of darkened vision along the line AB is materially less than the width of the corresponding darkened mirror along this line. On the other hand, with darkened transparent sections, the darkened view overlaps the clear view to the extent of HE or FJ along parallel lines, since the driver can look through these sections, thereby affording wider sectors of darkened vision corresponding to the full width of these sections.

Although darkened transparent sections are more desirable for the purpose of the present invention, the use of darkened mirrors as glare screens may be found advantageous.

Other screens that may be used for eliminating glare vibrations are similar to those called "Polaroid" screens, comprising transparent plastic sheets, having infinitesimal crystals, forming parallel slots through which the light passes. By using a pair of these sheets in opposed relationship, headlight glare through these sheets is eliminated.

Also, as far as certain aspects of the invention are concerned, certain sections of the mirror surface 12 of the upper plate may be darkened, and the lower sections 15, 16 and 16a formed with clear reflecting surfaces.

The anti-glare device may be reversed so that the observer looks into the upper instead of the lower mirror, and for driving on the right side of the road, darkened sections on the right of the device may be omitted, and for driving on the left side of the road, darkened sections on the left of the device may be omitted.

In Fig. 12 is shown another form of darkened transparent front piece 18a, somewhat similar to the front piece 18 of the construction of Figs. 1–11, with its longitudinal top section 19a and center rectangular section 20a. In addition, this front piece 18a is provided with end rectangular sections 30 and 31, adapted to extend in front of the glare absorbing sections 16 and 16a respectively. With this form of front piece 18a, the sections 15, 16 and 16a may be clear or darkened. If desired, this front piece 18a may be made of "Polaroid" material, and the sections 15, 16 and 16a as well as the end pieces 22 made of similar material, so that glare is eliminated in looking through the angular slots of said front piece and said sections.

In Fig. 13 is shown a double altiscope arrangement, which reflects the clear view at the same level as that of the actual view, and which comprises two altiscope units 32 and 33, disposed alongside of each other in reverse relationship, and provided with clear reflecting surfaces and glare screening sections, desirably in the form of darkened reflecting members, constructed and arranged as set forth with regard to the construction of Figs. 1–11. Since this construction is more cumbersome than the single altiscope type, it is more adaptable for attachment to the car.

The double altiscope device of Fig. 13 not only eliminates the raising or lowering of the reflected clear view, but also doubles the converging of the rays between superposed pairs of reflecting surfaces, since the image rays are converged in the first altiscope unit 32, and again in the second altiscope unit 33. This doubles the effect described in regard to the convergence of rays in the construction of Figs. 1–11.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:

1. An anti-glare device for use in vehicles, comprising altiscope means affording a substantially horizontal clear vision of the road, and including a pair of superposed plates, one of which is provided in its inner face with a pair of clear reflecting surfaces substantially in the same plane, means for supporting said altiscope means close to and in front of the driver's eyes with said reflecting surfaces in direct lines of road vision of said eyes respectively, a glare screen between said surfaces substantially in the plane thereof, and glare screens on the outer ends of said surfaces opposite said first screen and substantially in the plane thereof, said surfaces being centrally disposed in the line of vision of the respective eyes of the driver, and said glare screens limiting the margin of the clear reflected area observed in said surfaces to a substantially horizontal sector exclusive of the glare area ahead, and said screens affording a glareless view of the glare area ahead laterally of said sector.

2. An anti-glare device for use in vehicles, including a left altiscope means and a right altiscope means adapted to be mounted close to the driver's eyes, and affording substantially clear visions of the road for the respective left and right eyes of the driver, each of said means including a pair of superposed elements with reflecting surfaces facing each other, and a glare screening transparent plate extending along the front edges of said left and right altiscope means between said superposed elements, and including a longitudinal section extending along the front edge of one of said elements, a substantial distance from the other element to permit observation in the reflecting surface of said latter element, said longitudinal section affording a fully glare screened view of the road, and a section extending between said left and right altiscope means substantially across the full distance therebetween, and serving to screen out the glare from the rays reflected from the left altiscope means to the right eye, and from the right altiscope means to the left eye.

3. An anti-glare device for use in vehicles including a left and a right altiscope means, each of said means including a pair of superposed parallel plates, one of said plates having a clear reflecting surface on its inner face, the other plate having a clear reflecting section on its inner face, and a pair of glare screening sections on opposite sides of said clear section, and substantially in the same plane thereof, said glare screening sections determining the margins of the clear reflected area observed in one of said plates turned towards the vision, and affording laterally beyond the sector of clear reflected view observed in said latter plate a glareless view of the glare area ahead, the convergence of the image rays between the superposed plates permitting a clear reflected view between said margins of an area ahead of materially greater width, close to the eyes, than would be afforded by an unreflected view through a space between said margins.

4. An anti-glare device for use in vehicles including a left and a right altiscope means, each of said means including a pair of clear mirrors spaced apart and facing each other in superposed parallel relationship, one of said mirrors being turned towards the view ahead, and the other turned towards the vision to afford therein a clear reflected view of a substantially horizontal sector of the area ahead, a pair of glare screens determining the margins of the clear reflected area observed in said last-mentioned mirror, and affording laterally beyond the sector of clear reflected vision viewed in said latter mirror a glareless view of the glare area ahead, the convergence of the image rays between the superposed mirrors permitting a clear reflected view between said glare screens of an area ahead of materially greater width, close to the eyes, than would be afforded by an unreflected view through a space between said glare screens, and means for supporting said altiscope means in front of and close to the eyes in the direct line of vision.

5. An anti-glare device including a pair of clear mirrors spaced apart, and facing each other in superposed parallel relationship, one of said mirrors being turned towards the view ahead and the other turned towards the vision to afford therein a clear reflected view of a substantially horizontal sector of the area ahead, glare screens determining the margins of the clear reflected area observed in said last-mentioned mirror, and affording laterally beyond the sector of clear reflected vision viewed in said latter mirror a glareless view of the glare area ahead, said glare screens being disposed sufficiently close together, whereby an unreflected clear view therebetween would include an area substantially less, close to the eyes, than the glareless area ahead, the convergence of the light rays between the superposed mirrors permitting a clear reflected view between said glare screens of an area ahead of materially greater width, close to the eyes, than would be afforded by an unreflected view between said glare screens.

6. An anti-glare device including a left altiscope means and a right altiscope means affording substantially clear reflected views of the area ahead to the respective left and right eyes of the observer, each of said means including a pair of superposed elements with clear reflecting surfaces facing each other and one of said surfaces turned toward the vision, means for supporting said altiscope means in front of and close to the observer's eyes in his direct lines of vision ahead, means for preventing cross-reflections of glare from the left altiscope means to the right eye and from the right altiscope means to the left eye, glare screens determining the margins of the clear reflected area observed in said last mentioned reflecting surface and affording laterally beyond the sector of clear reflected vision viewed in said latter surface a glareless view of the glare area ahead, the convergence of the image rays between the superposed reflecting surfaces permitting a clear reflected view between said glare screens of an area ahead of greater width, close to the eyes, than would be afforded by an unreflected view through the space between said glare screens.

7. An anti-glare device for use in vehicles including a left altiscope means and a right altiscope means adapted to be mounted close to the driver's eyes and affording substantially clear visions of the road for the respective left and right eyes of the driver, each of said means including a pair of superposed elements with clear reflecting surfaces facing each other and one of said surfaces turned toward the vision, means for eliminating the glare from the rays reflected from the left altiscope means to the right eye and from the right altiscope means to the left eye, and including a glare screening transparent plate disposed between said left altiscope means and said right altiscope means and extending between said superposed elements at the front edges thereof in a plane transverse to the driver's line of vision therethrough, said transparent plate being sufficiently narrow so as not to intercept the lines of vision directed towards the reflecting surface turned towards the vision, glare screens determining the margins of the clear reflected area observed in said last mentioned reflecting surface and affording laterally beyond the sector of clear reflected vision viewed in said latter surface a glareless view of the glare area ahead, the convergence of the image rays between the superposed reflecting surfaces permitting a clear reflected view between said glare screens of an area ahead of greater width, close to the eyes, than would be afforded by an unreflected view through the space between said glare screens.

8. An anti-glare device for use in vehicles including a pair of reflecting altiscope plates spaced apart and facing each other in superposed parallel relationship, one of said plates being turned towards the view ahead and the other turned towards the vision, and means affording by observation into said last mentioned plate a clear reflected view of the glareless area ahead and a glareless view of the glare area laterally beyond said glareless area and including means determining the margins of the clear reflected area observed in said last mentioned plate and affording laterally beyond the sector of clear reflected vision viewed in said latter plate a glareless view of the glare area ahead, the convergence of the image rays between the superposed plates permitting a clear reflected view between said margins of an area ahead of greater width, close to the eyes, than would be afforded by an unreflected view through the space between said margins.

FRANCIS C. SCHWAB.